United States Patent [19]

Spokoyny et al.

[11] Patent Number: 5,237,939
[45] Date of Patent: Aug. 24, 1993

[54] METHOD AND APPARATUS FOR REDUCING NOX EMISSIONS

[75] Inventors: Felix E. Spokoyny, Costa Mesa; Henry V. Krigmont, Seal Beach, both of Calif.

[73] Assignee: Wahlco Environmental Systems, Inc., Santa Ana, Calif.

[21] Appl. No.: 933,487

[22] Filed: Aug. 20, 1992

[51] Int. Cl.$^5$ .............................. F23J 15/00
[52] U.S. Cl. .................... 110/345; 110/203; 165/7; 422/171; 422/172; 423/235; 423/239.1
[58] Field of Search ............ 110/344, 345; 165/5, 165/7; 422/171, 172, 181; 423/235, 237, 239

[56] References Cited

U.S. PATENT DOCUMENTS 4,602,673  7/1986  Michelfelder et al.
5,078,973  1/1992  Kuroda et al. ............... 422/171
5,145,652  9/1992  Veser et al. ................ 422/172 X

OTHER PUBLICATIONS

M. Kotter et al., "Selective catalytic reduction of nitrogen oxides—an original concept," *International Chemical Engineering*, vol. 31, No. 4, pp. 685–692 (Oct. 1991).
J. L. Reese et al., "Evaluation of SCR Air Heater for NOx Control on a Full-Scale Gas and Oil-Fired Boiler," *1991 Joint Symposium on Stationary Combustion NOx Control*, Washington, D.C., (Mar. 1991) [copy of reference has no page numbering].

*Primary Examiner*—Edward G. Favors
*Attorney, Agent, or Firm*—Gregory Garmong; Howard Sandler

[57] ABSTRACT

An apparatus for reducing NOx pollution in the flue gas produced by a burner includes a heat exchanger wherein at least some of the heat transfer elements are coated with a catalyst. A plurality of reactive gas injectors are arranged to introduce a nitrogeneous compound, preferably a source of ammonia, across a hot-end face of the heat exchanger. A reactive gas flow distribution system permits the distribution of the nitrogeneous compound flowing through at least some of the gas injectors to be varied responsive to the temperature profile of the heat exchanger. Preferably, the apparatus also determines the total NOx flow in the flue gas, and the reactive gas flow distribution system permits the total amount of reactive gas flowing through at least some of the gas injectors to be varied responsive to the total NOx flow in the flue gas.

19 Claims, 4 Drawing Sheets

ME THOD AND APPARATUS FOR REDUCING NOX EMISSIONS

BACKGROUND OF THE INVENTION

This invention relates to power plant pollution reduction equipment, and, more particularly, to an apparatus that reacts NOx in a flue gas stream with a nitrogenous compound such as a source of ammonia in the presence of a catalyst to reduce the NOx level of the flue gas.

In a fossil-fuel power plant, coal, oil, or natural gas is burned in a combustor. The combustion gas, also known as flue gas, heats water to form stream, which turns a turbine-generator to produce electric power. The flue gas stream is passed through an air preheater, such as a rotating wheel heat exchanger, that transfers heat from the flue gas to an incoming air stream that thereafter flows to the combustor.

The flue gas contains solid particulate and pollutant gases such as sulfur oxides, known as SOx, and nitrogen oxides, known as NOx. To remove the NOx, a nitrogenous compound such as ammonia is injected into the flue gas stream. The ammonia reacts with the NOx to form nitrogen and water, reducing the NOx content of the flue gas. The reaction of ammonia and NOx may be performed at high temperature without a catalyst, a process termed "selective noncatalytic reduction" (SNCR), or at lower temperature in the presence of a catalyst, a process termed "selective catalytic reduction" (SCR).

Selective noncatalytic reduction is accomplished by injecting a nitrogenous compound such as a source of ammonia into the hot flue gas, and permitting the reduction reaction to occur in the flowing gas. Selective catalytic reduction is accomplished by placing catalyst onto surfaces of a stationary selective catalytic reduction assembly in the form of a fixed catalyst bed and/or onto some of the heat exchange elements of the air preheater. Ammonia is injected upstream of the catalytic reduction assembly and the catalyst-coated elements of the air preheater, as required to accomplish the reaction with NOx in the presence of the catalyst.

It is important to accomplish the reaction of the ammonia and NOx in an efficient manner, for maximum possible reaction of both the NOx and of the ammonia. If the reaction is incomplete, either NOx or ammonia (or both) may pass through to the stack gas and be emitted to the atmosphere. Both NOx and ammonia are classified as pollutants, and their emission is to be maintained within legal limits.

It has been observed in some power plants that, no matter how carefully the ammonia addition is controlled, the catalyzed reaction is incomplete and that either excess NOx or excess ammonia, or both, slip through to the stack gas. There is a need for an understanding of, and solution to, this problem. Such a solution would desirably improve the utilization of ammonia so that the catalyzed reaction between the NOx in the flue gas and the ammonia would be more nearly complete. The present invention fulfills this need, and further provides related advantages.

SUMMARY OF THE INVENTION

The present invention provides a method and apparatus for controlling the injection of a nitrogenous compound such as a source of ammonia to a heat exchanger apparatus having catalyst-coated elements that promote the reaction between NOx in a flue gas stream and ammonia. The approach of the invention increases the extent to which a complete reaction can be accomplished. The result is reduced levels of NOx and ammonia reaching the exhaust stack. The approach requires only minor apparatus modification.

In accordance with the invention, a method for reducing NOx from a flue gas stream produced from a burner comprises the steps of passing a flow of flue gas through an apparatus, such as a heat exchanger, having catalyst-coated elements whose temperature varies as a function of position across the lateral face of the heat exchanger. The method further includes injecting a spatially variable flow of a nitrogenous compound, which is preferably a source of ammonia, into the flow of flue gas at a location prior to the entry of the flue gas into the apparatus, and varying the spatial distribution of the flow of the nitrogenous agent responsive to the spatial temperature variation of the catalyst-coated elements to achieve efficient catalytic reduction of the NOx and ammonia on the catalyst.

The invention also extends to an apparatus for accomplishing this approach. In accordance with this aspect of the invention, apparatus for reducing NOx from a flue gas stream produced from a burner comprises means for reacting a flow of flue gas with a nitrogenous compound, which is preferably a source of ammonia, at the surface of a catalyst to react and reduce NOx in the flue gas, the means for reacting exhibiting a variation of temperature therein. The apparatus further includes means for adding a spatially controllably variable flow of a nitrogenous compound such as a source of ammonia to the flow of flue gas prior to the entry of the flue gas into the means for reacting, and means for adjusting the spatial distribution of the flow of the nitrogenous compound responsive to the variation of temperature within the means for reacting.

In a preferred approach, the nitrogenous compound, which may be ammonia or a compound that reacts to produce ammonia, is supplied through injector nozzles supported on manifolds that extend above the entry-side face of the heat exchanger. The total ammonia introduced is selected to be an amount sufficient to react the NOx in the flue gas, as determined from measurements or predictions of the composition of the flue gas. The total flow of ammonia is distributed among the manifolds, and thence the gas injector nozzles, according to the temperature profile of the apparatus.

The temperature distribution of a catalyst in any region of the apparatus determines the amount of NOx and ammonia reacted. In general, the higher the temperature within the operating range of the catalyst, the more NOx and ammonia will react together. The temperature distribution of the catalyst may be determined either by temperature measurements or by predictions of temperature based upon the boiler load and performance.

The catalyst performance may also be assessed in terms of the "space velocity" of the catalyst, defined as the volumetric flow (in cubic feet per hour) of flue gas divided by the volume (in cubic feet) of reactive catalyst. In general, the higher the volume of catalyst operating in the effective temperature range, the lower the space velocity and the better is the conversion efficiency in the reaction of NOx and ammonia at the catalyst.

Thus, the higher the temperature of a region of the catalyst within its effective range and the lower the space velocity, the more ammonia could be utilized. The temperature is the highest in the hot-end heat exchanger elements as they pass from the flue gas side to the air side of the heat exchanger. The space velocity varies when the catalyzed heat transfer elements travel in an arcuate pass with respect to the flue gas flow.

In one example of interest, the temperature profile of the heat transfer elements of a rotating-wheel heat exchanger varies according to their position. As the heat transfer elements move from the air (cold) side to the flue gas (hot) side where they are exposed to the high-temperature flue gas, they begin to heat from a relatively low temperature. Continued exposure as the wheel rotates gradually increases the temperature of the heat transfer elements, until they reach a maximum temperature just as they pass to the air side. This uneven temperature distribution is unavoidable in the operation of the heat exchanger. A greater extent of reaction between NOx and ammonia is achieved over the heat transfer elements coated with catalyst as their temperature rises. Thus, the injection rate of ammonia should increase with increasing distance of exposure to the hot flue gas and thence increasing temperature. Overall, the result is more NOx reduced and less ammonia slip through the heat exchanger, as compared with the conventional practice of providing a spatially uniform concentration of ammonia. Where the ammonia concentration is uniformly distributed, unreacted NOx and ammonia slip through the cooler regions of the heat exchanger. The injection rate should also increase with a decreased space velocity (increase in active volume of catalyst). The invention reduces the extent of the incomplete reaction, producing improved pollutant reduction.

The present invention provides an important advance in the art of power plant operation. The injection of ammonia reactant is tailored to the actual operating conditions of the system, resulting in improved utilization and less opportunity for either NOx or ammonia to reach the environment. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
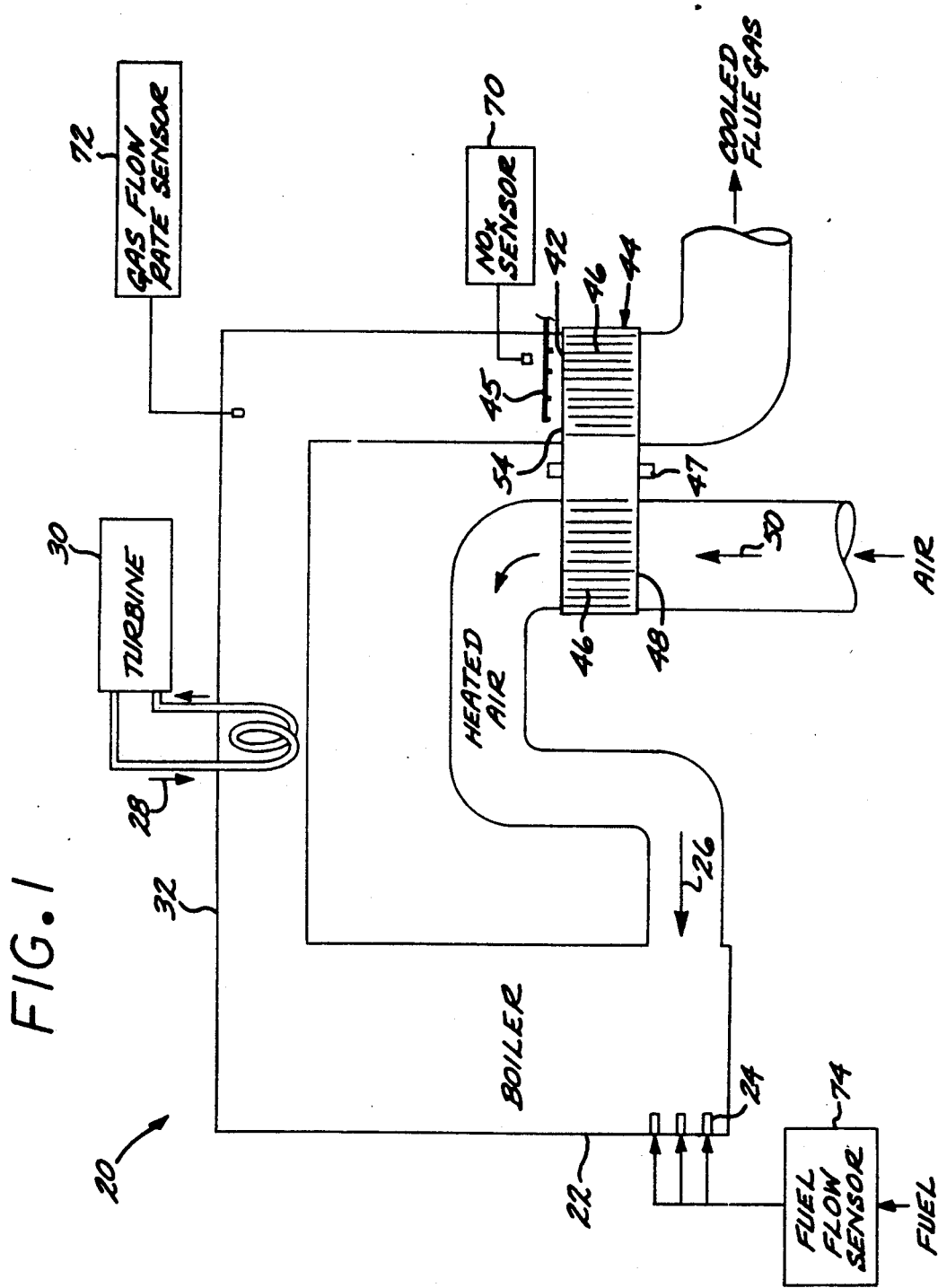
FIG. 1 is a schematic view of a portion of a power plant flue gas flow system according to the invention.

FIG. 1 depicts a power plant 20 utilizing the present invention. A fuel such as oil, gas, or coal is fed into a boiler 22 through burners 24. The fuel is mixed with an incoming preheated air flow 26 and burned, producing hot combustion gas known as flue gas. The flue gas heats a water flow 28 to form steam, which turns a turbine/generator 30 to produce electricity.

The hot flue gas passes along a hot flue gas conduit 32 to a hot end 54 of a flue gas side 42 of a heat exchanger 44, here illustrated as the preferred rotating wheel-type or L'jungstrom heat exchanger. Ammonia is injected into the flue gas stream through reactive gas injectors 45, located in the flue gas stream just before it enters the heat exchanger 44. It is these injectors 45 and the flow rate of ammonia therethrough that is a principal focus of the invention, and will be discussed in greater detail. The heat exchanger 44 includes a plurality of heat exchange elements 46, which are heated by the passage of the hot flue gas. The cooled flue gas, after transferring its heat to the heat exchange elements 46, flows to additional pollution control equipment, such as an electrostatic precipitator (not shown), and eventually to a stack for release.

The wheel of the heat exchanger 44 continuously rotates about its axis 47, which may be oriented either vertically or horizontally, to carry the heat exchange elements 46 from the flue gas side 42 to an air side 48. Here, the heat in the heat exchange elements 46 is transferred to a flow of cool incoming air 50, which flows to the boiler 22 to become the incoming air 26 used in combustion.

Preferably, at least a portion of the heat exchange elements 46, at their hot ends 54 as measured along the axis of rotation, are coated with a catalyst. The catalyst may be any catalytic material operable to aid in the reaction of NOx and ammonia, and is preferably selected from the group consisting of vanadia, tungsten, zeolite, noble metals, and transition metals. The NOx in the flue gas reacts with ammonia in the flue gas in the presence of the catalyst.

Figure 2:
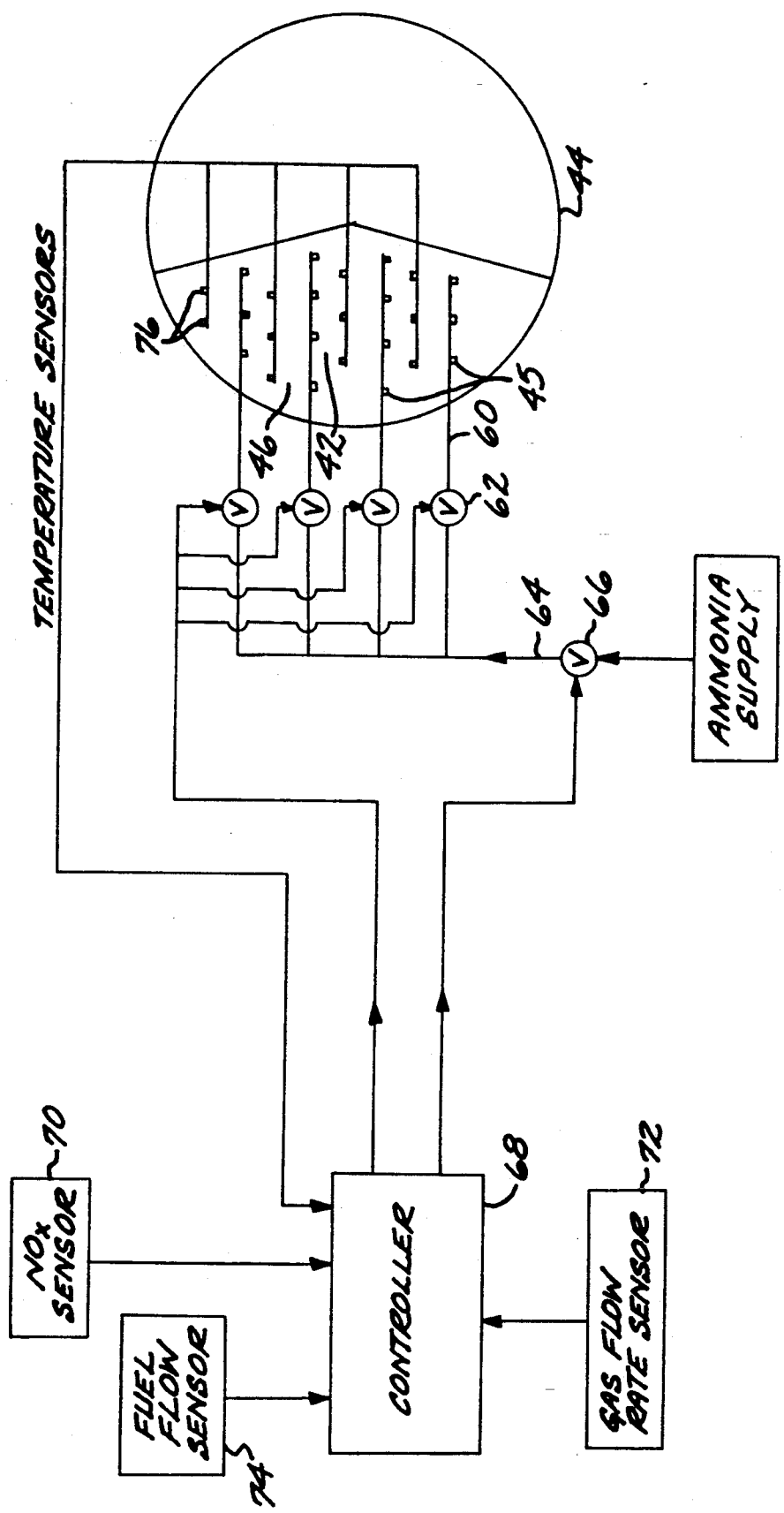
FIG. 2 is a schematic view of a reactive agent delivery system.

FIG. 2 depicts the preferred reactive gas delivery system for delivering the supply of nitrogenous reactive gas to the injectors 45 in greater detail. The heat exchanger 44 is depicted in plan view, with injectors 45 positioned over the flue gas side 42. The injectors 45 are supported on at least two, and preferably several, manifolds 60. All of the injectors 45 connected to a single manifold 60 deliver substantially the same reactive gas flow rate. Each manifold 60, however, has a remotely controlled valve 62 that sets the total reactive gas flow through the manifold, and thence determines the flow through each of the injectors 45 connected to the manifold.

The manifolds 60 are connected to a reactive gas plenum 64, which has a main flow regulating valve 66 therein. Thus, the total flow to all of the injectors 45 is determined by the main valve 66, while the individual manifold valves 62 determine the proportion of that total flow which reaches the individual injectors 45. Substantially equivalent configurations of valving can be substituted. Other arrangements of manifolds and valves to permit spatial variation of the flow of the reactive nitrogenous gas can be provided, and are considered as equivalents. For example, each injector 45 could be supported on its own individually valved manifold. However, this arrangement would be more complex and expensive, and it has been determined that the arrangement illustrated in FIG. 2 is sufficient. The provision of gas to the catalyst-coated heat transfer elements 46 of the heat exchanger 44 involves complex flow paths and chemistry in the distribution and adsorption of the ammonia to the heat transfer elements 46. A sector-oriented approach such as shown is sufficient in many cases to provide the required distributions.

The control of the gas distribution is achieved by the valves 62 and 66, under control of a controller 68. The injected nitrogeneous compound, here ammonia, is apportioned generally according to a number of factors, with total NOx loading, temperature distribution of the catalyst-coated elements of the heat exchanger 44, and space velocity being the predominant considerations.

The NOx concentration of the flue gas is measured by a NOx sensor 70 placed upstream of the heat exchanger 44. (The general locations of the sensors are shown in FIG. 1, and their functional relation to the controller 68 is shown in FIG. 2.) The total flue gas flow within the conduit 41 is measured by a flow rate sensor 72. The total mass flow NOx loading is the product of the NOx concentration and the total flue gas flow. The main flow regulating valve 66 is opened to permit an ammonia mass flow sufficient to react this total NOx flow to produce nitrogen and water. An indicator of changes in the total mass flow NOx loading is the boiler load, here measured as the amount of fuel being burned in the boiler 22. The amount of fuel being burned is measured by a fuel flow sensor 74. This information is used to make changes in the flow of the valve 66 in anticipation of changes in the NOx loading.

Figure 3:
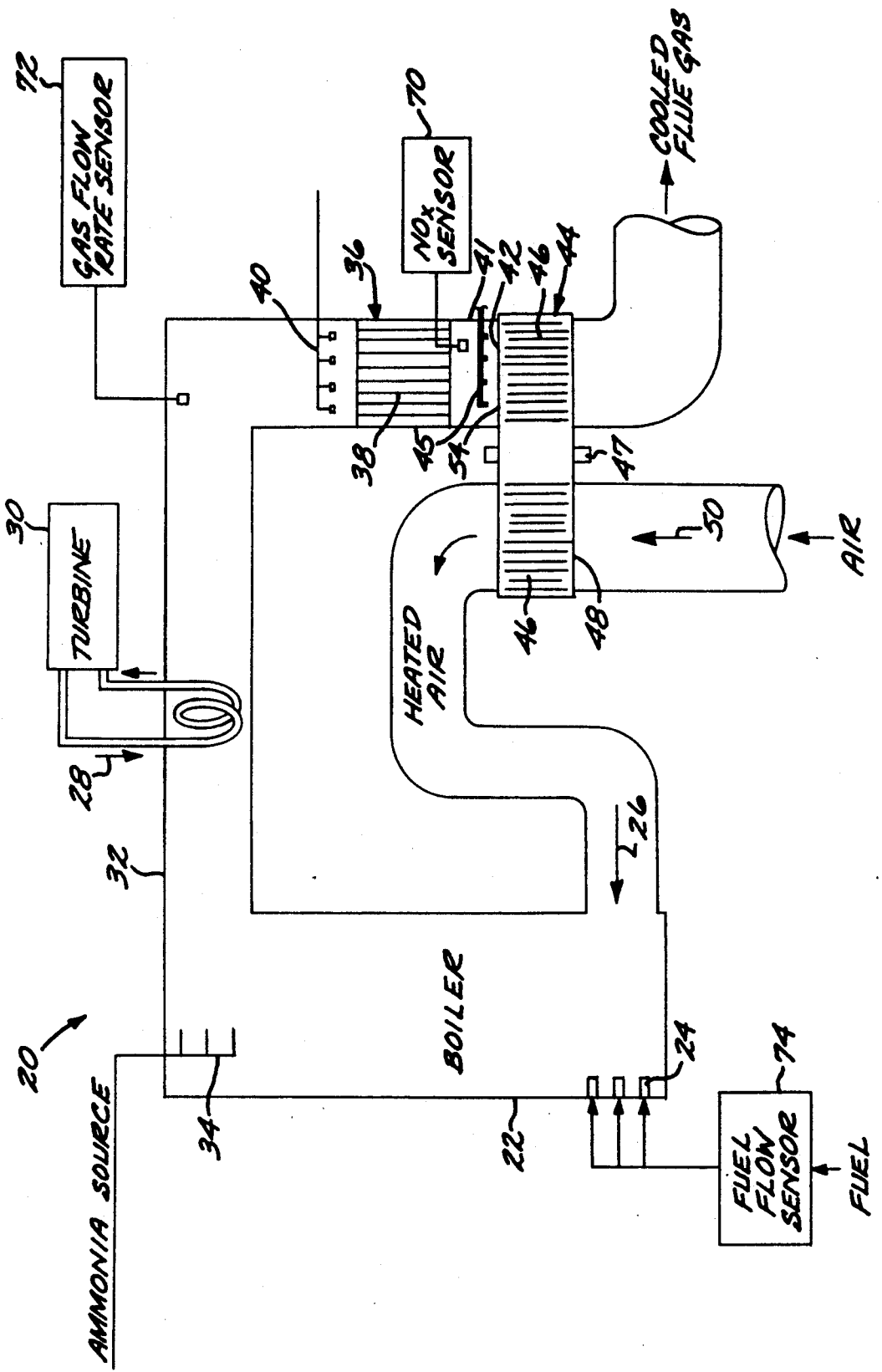
FIG. 3 is a schematic view like that of FIG. 1, except where a fixed catalyst bed is also used.

A variation of the previously described power plant 20 is shown in FIG. 3. The present invention is operable with this variation as well as that shown in FIG. 1. The power plant of FIG. 3 is comparable with that of FIG. 1 in most respects, and corresponding elements have been assigned the same numbers. The power plant of FIG. 3 differs from that of FIG. 1 in that two additional NOx reduction techniques are implemented. The present invention is operable in conjunction with these modifications applied either singly or together.

In one modification, a nitrogenous agent providing a source of ammonia may be injected into the hot flue gas through injectors 34, either before it enters the conduit 32 or as it flows through the conduit 32. The ammonia reacts with the NOx in the flue gas by selective noncatalytic reduction (SNCR) to reduce the NOx level of the flue gas. In the other modification, the flue gas flowing in the conduit 32 passes through a stationary selective catalytic reduction (SCR) assembly 36, preferably in the form of a fixed catalyst bed, prior to entering the heat exchanger 44. The reduction assembly includes a plurality of surfaces 38 having coated thereon a catalyst generally of the same type as discussed previously. A nitrogenous agent that is a source of ammonia is injected into the flue gas upstream of the reduction assembly 36 through injectors 40, as needed. The NOx in the flue gas reacts with the ammonia in the flue gas in the presence of the catalyst to reduce the NOx, in a selective catalytic reduction reaction. After leaving the reduction assembly 36, the flue gas flows through a short conduit 41 and enters the heat exchanger 44 containing the catalyst-coated elements.

Regardless of the configuration of the power plant, the temperature profile of the heat exchange elements 46 may be measured with temperature measuring devices. In the preferred embodiment of FIG. 2, a set of thermocouples 76 mounted to the heat exchange elements 46 measure the spatial temperature distribution. Other types of temperature measuring devices such as pyrometers may also be used. Equivalently, the temperature distribution can be predictively calculated based on the gas temperature distribution measurements. In this approach, the settings are predicted from the heat transfer calculations and kinetic data for the catalyzed reaction of ammonia and NOx in the heat exchanger operating environment.

From the temperature distribution, determined by measurements or calculations or a combination of these approaches, the preferred flow distribution through the injectors 45 is selected by adjusting the valves 62. Generally, the higher the temperature in a region, the higher the ammonia injection rate for that region.

Figure 4:
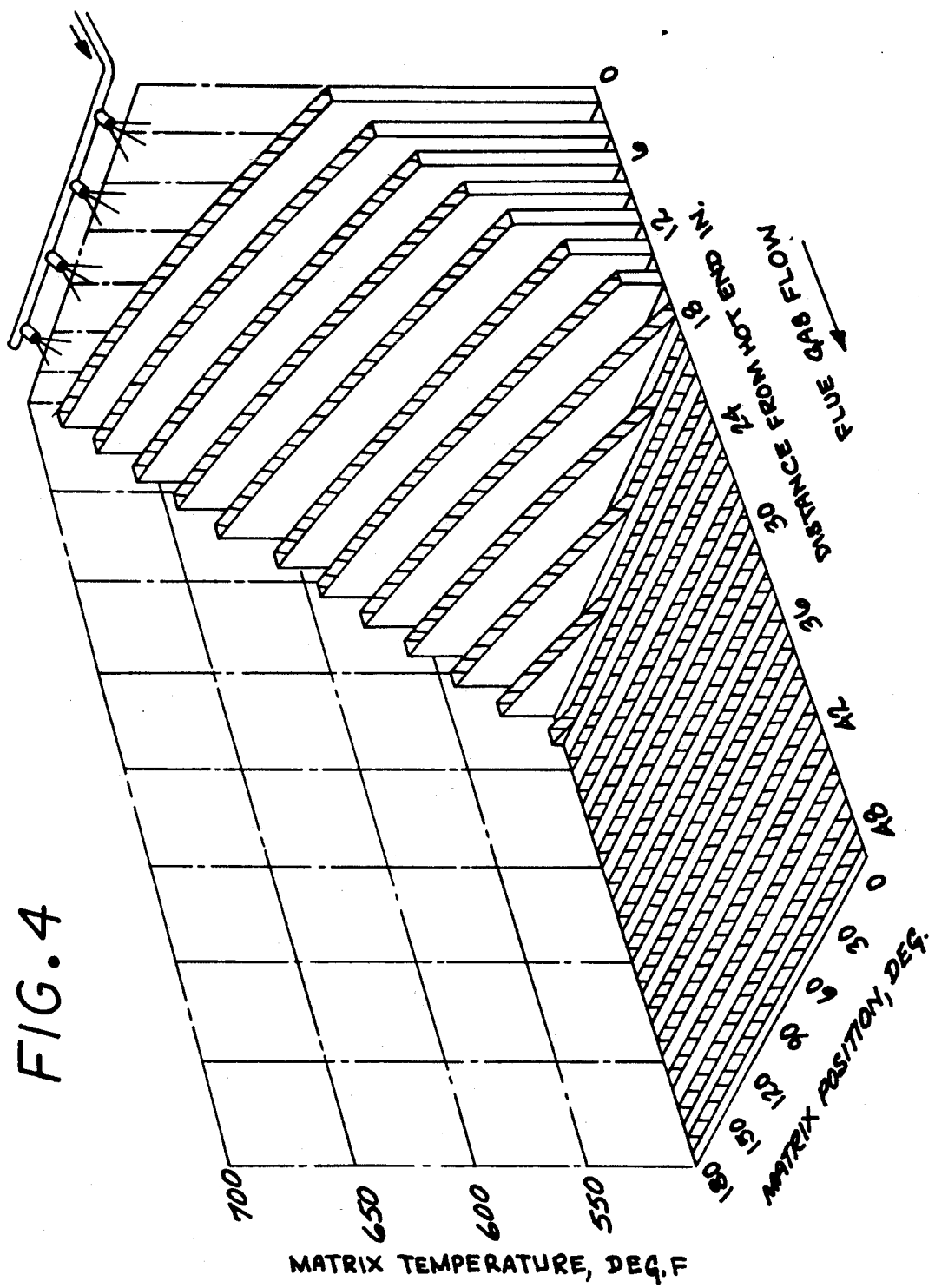
FIG. 4 is a graph showing the two-dimensional temperature distribution of the heating elements in a heat exchanger wheel.

FIG. 4 depicts a typical two-dimensional temperature distribution on the flue gas side of the rotating wheel heat exchanger 44, at a fixed radial distance from the axis of rotation. The temperature within the heat exchanger 44 varies in two ways. First, the temperature increases with increasing angular position as measured from the entry of a particular element into the flue gas side. Second, the temperature decreases with increasing distance from the hot end, where the flue gas first enters the heat exchanger 44. Only those heat exchange elements near the hot end of the heat exchanger wheel 44 need be coated with catalyst, because those further from the hot end never reach a sufficiently high temperature to permit catalytic reaction.

The first or angular temperature variation within the heat exchanger 44 is of the most direct interest in relation to the present invention, inasmuch as the injection arrangement of FIG. 2 introduces a flow of ammonia that varies according to the angular position. According to this temperature distribution, the greatest flow rate of ammonia should be injected near the 180 degrees angular position where the larger volume of the catalyst is in the effective temperature range, and the least amount near the 0 degrees angular position. The amount injected near 0 degrees angular position is not itself zero, as the heat exchanger elements quickly reach an elevated temperature within the reactive range of the catalyst and therefore require a sufficient ammonia concentration for reaction to the extent possible at that temperature.

As indicated, the temperature distribution shown in FIG. 4 is at a selected radial distance from the axis of rotation of the wheel of the heat exchanger 44. Comparable, but somewhat different, temperature distributions occur at other radial positions.

Once the initial total ammonia mass flow rate and the initial distribution determined according to this approach have been implemented, the values of total flow and flow distribution may be further varied in a feedback control manner. NOx and ammonia sensors are placed downstream of the heat exchanger 44 in the stack gas. The measured values are observed for various combinations of total ammonia mass flow rate and injected ammonia distribution, and the control settings of the valves 62 and 66 are varied to seek lower values of stack NOx and ammonia within legal limits of these pollutants.

This control approach amounts to a perturbation technique of the type well known in the art, and is preferably conducted automatically by the controller 68 in a regular search routine. For each operating condition of the power plant boiler, fuel type, etc., a set of ammonia total flow and distribution settings is developed and stored in the memory of the controller. Thereafter, when the power plant operating conditions are changed, the controller selected the settings for the valves 62 and 66 that are the same as, or most closely approximate, the new operating conditions, set the valves to those values, and commences a perturbation routine to search for even better combinations of the valve settings for those particular operating conditions.

Equivalently, a predictive modeling approach may be used to predict settings for the valves 62 and 66 from operating parameters and measurements of the system. The predictive and measurement techniques may be combined in fine tuning the control of the injection valves.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method of reducing NOx from a flue gas stream produced from a burner, which flue gas stream passes from the burner through a rotary regenerative heat exchanger which rotates in a direction generally transverse to the direction of the flow of the flue gas stream and wherein at least a portion of the heat transfer elements of the heat exchanger carry a catalyst which, in the presence of a nitrogeneous compound, promote the reduction of NOx from the flue gas stream passing thereby, comprising the steps of:

injecting a quantity of a nitrogeneous compound onto the catalyzed heat transfer elements, such injecting being at a plurality of fixed locations along the arcuate path of travel of the catalyzed elements with respect to the flue gas stream;

determining the temperature of the portion of the heat transfer elements as such elements travel in an arcuate path with respect to the flow of the flue gas stream; and in response to said step of determining, selectively varying the quantity of nitrogeneous compound injected at each of such fixed locations.

2. The method of claim 1, wherein the step of varying includes the steps of adjusting the total flow of the nitrogeneous compound responsive to the total amount of the pollutant in the flue gas, and apportioning the spatial variation of the flow of the nitrogeneous compound responsive to the temperature variation of the heat transfer elements.

3. A method for reducing NOx from a flue gas stream produced from a burner, comprising the steps of:

passing a flow of flue gas through a heat exchanger having catalyst-coated heat transfer elements whose temperature varies as a function of position across the lateral face of the heat exchanger;

injecting a spatially variable flow of a nitrogeneous compound into the flow of flue gas at a location prior to the entry of the flue gas into the heat exchanger; and varying the spatial distribution of the flow of the nitrogeneous agent responsive to the spatial temperature variation of the heat transfer elements to achieve efficient catalytic reduction of the NOx in the flue gas on the catalyst.

4. The method of claim 3, wherein the step of varying includes the steps of adjusting the total flow of the nitrogeneous compound responsive to the total amount of the pollutant in the flue gas, and apportioning the spatial variation of the flow of the nitrogeneous compound responsive to the temperature variation of the heat transfer elements.

5. The method of claim 3, wherein the heat exchanger is a rotating-wheel heat exchanger.

6. Apparatus for reducing NOx from a flue gas stream produced from a burner, comprising:

means for reacting a flow of flue gas with a nitrogeneous compound in the presence of a catalyst to react and reduce NOx in the flue gas, the means for reacting exhibiting a variation of temperature therein;

means for adding a spatially controllably variable flow of a nitrogeneous compound to the flow of flue gas prior to the entry of the flue gas into the means for reacting; and means for adjusting the spatial distribution of the flow of the nitrogeneous compound responsive to the variation of temperature within the means for reacting.

7. The apparatus of claim 6, wherein the means for reacting includes a heat exchanger having heat exchange elements therein and a catalyst coated onto at least some of the heat exchange elements.

8. The apparatus of claim 7, wherein the heat exchanger is a rotating-wheel heat exchanger.

9. The apparatus of claim 6, wherein the means for adding includes a plurality of gas injectors disposed adjacent to a portion of the means for reacting through which the flue gas first passes.

10. The apparatus of claim 9, wherein the means for adding includes at least two gas manifolds, and the gas injectors are supplied by the gas manifolds.

11. The apparatus of claim 10, further including
  a gas flow distribution system that adjusts the total flow of the nitrogeneous compound to the manifold pipes responsive to the total NOx level.

12. The apparatus of claim 10, further including
  a gas flow distribution system that adjusts the flow of the nitrogeneous compound in each gas manifold responsive to the temperature distribution within the means for reacting.

13. The apparatus of claim 6, further including
  means for determining the total NOx level in the flue gas.

14. The apparatus of claim 13, wherein the means for determining includes means for measuring the pollutant level of the flue gas before it has entered the means for reacting.

15. The apparatus of claim 13, wherein the means for determining includes means for measuring the operating conditions of a burner that produces the flue gas.

16. The apparatus of claim 6, further including
  means for determining the temperature distribution within the means for reacting.

17. The apparatus of claim 16, wherein the means for determining includes a plurality of temperature measuring devices that measure the temperature distribution within the means for reacting.

18. The apparatus of claim 17, wherein at least some of the temperature measuring devices are thermocouples.

19. The apparatus of claim 13, wherein the means for adjusting includes
  means for controlling the total flow of the nitrogeneous compound flowing to the means for adding responsive to the total NOx level of the flue gas, and
  means for controlling the spatial distribution of the flow of nitrogeneous agent responsive to the temperature variation of the means for reacting.

* * * * *